Jan. 3, 1961 F. J. HOOVEN ET AL 2,966,835
PHOTOGRAPHIC TYPE COMPOSITION
Filed May 27, 1957 6 Sheets-Sheet 6

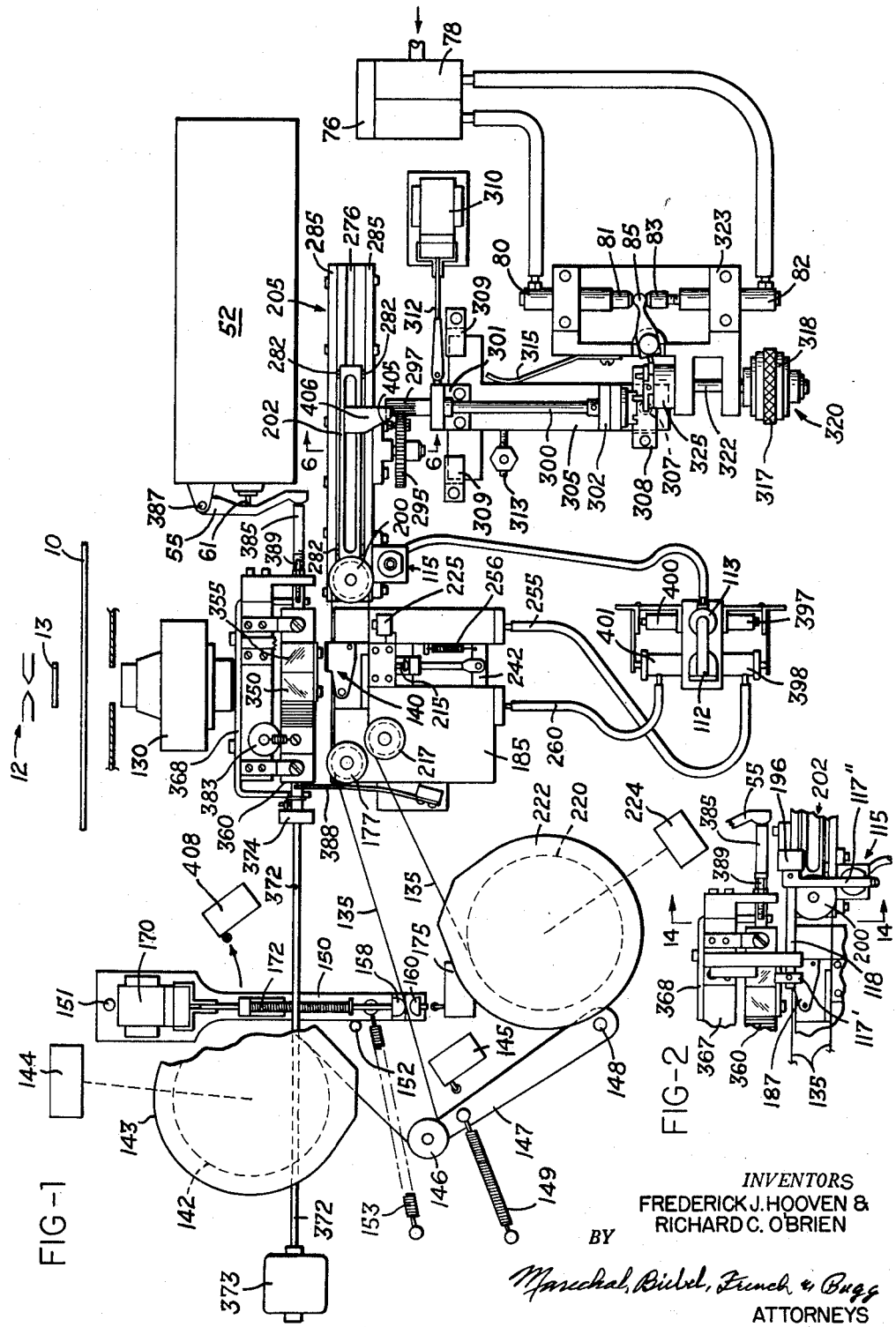

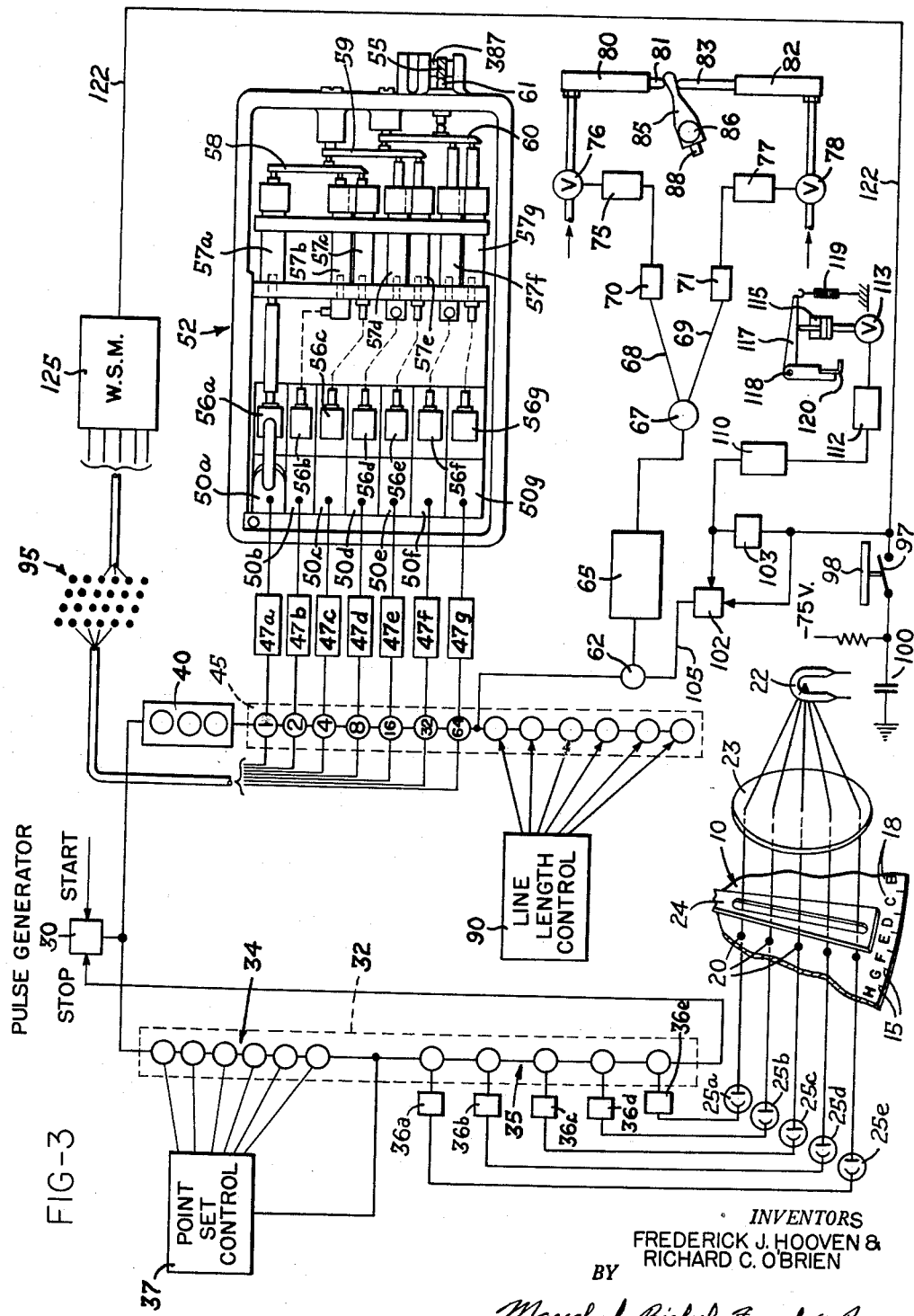

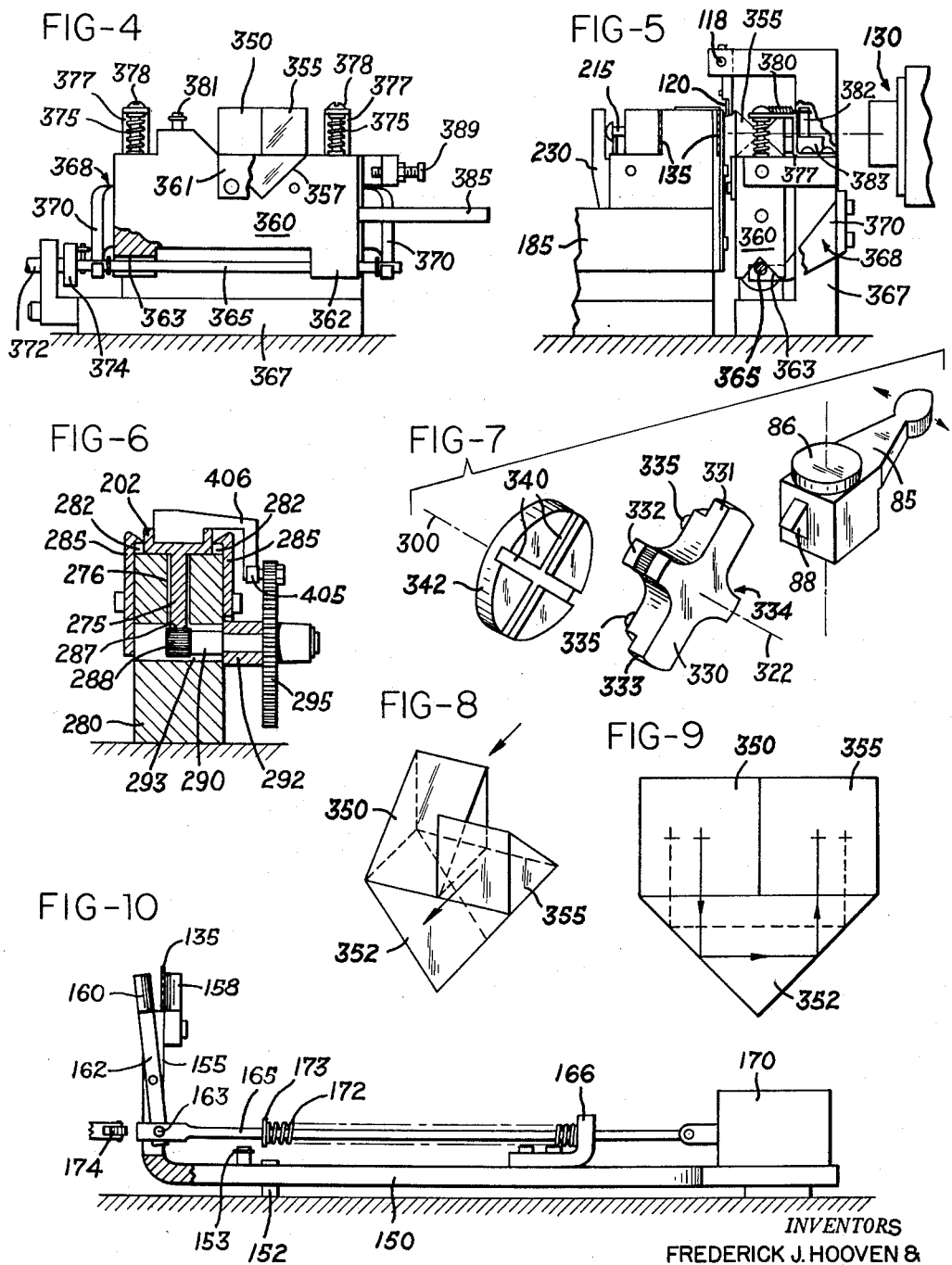

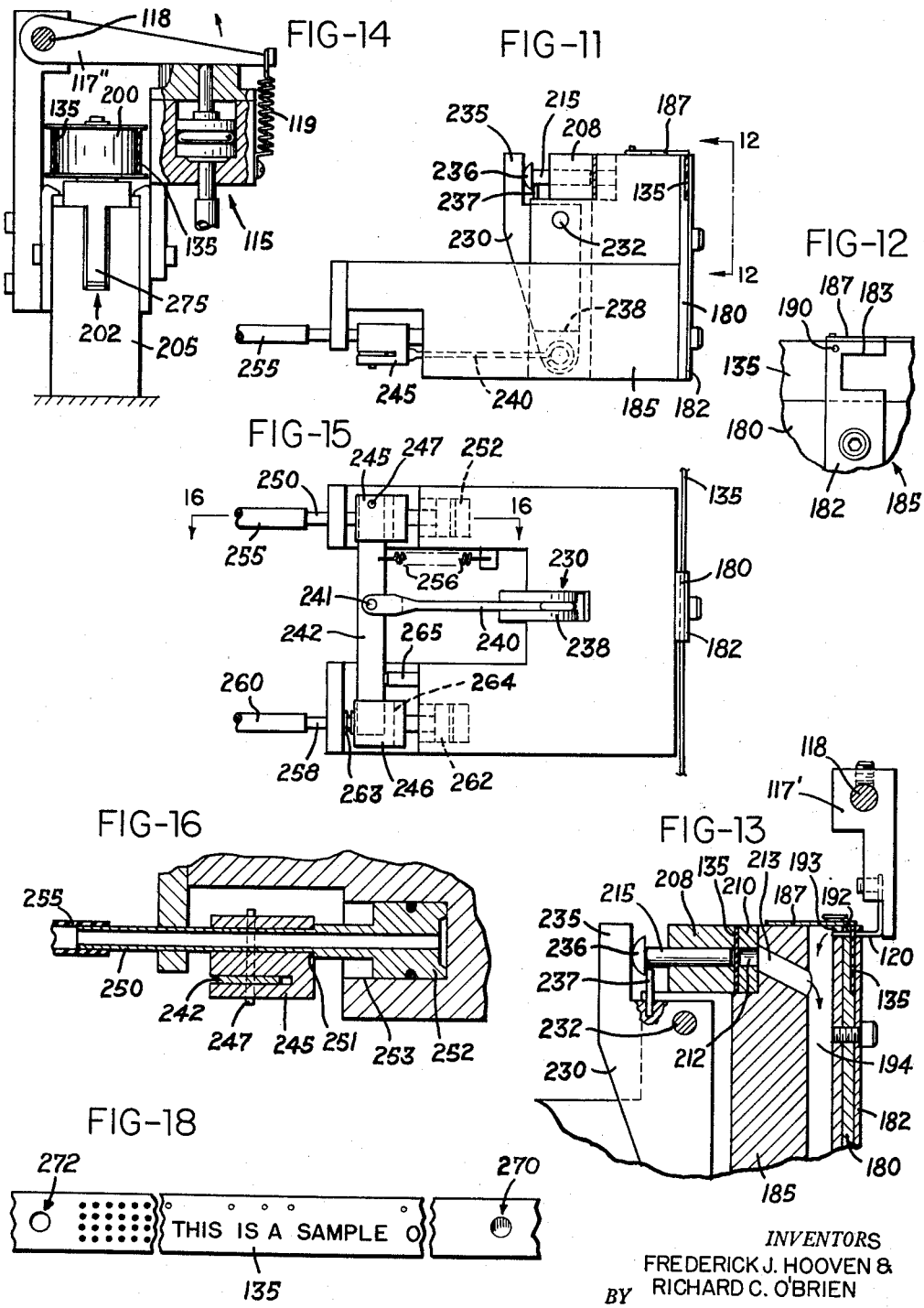

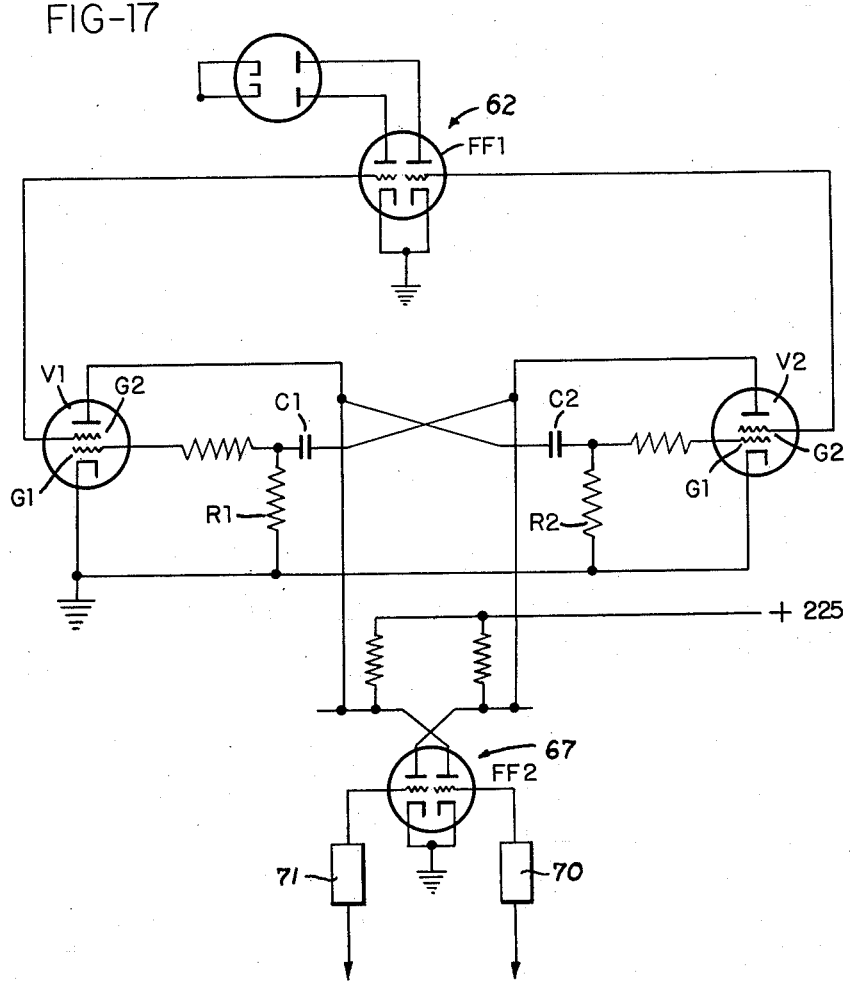

INVENTORS
FREDERICK J. HOOVEN &
BY RICHARD C. O'BRIEN

Marshal, Biebel, French & Bugg
ATTORNEYS

United States Patent Office 2,966,835
Patented Jan. 3, 1961

2,966,835

PHOTOGRAPHIC TYPE COMPOSITION

Frederick J. Hooven, Dayton, and Richard C. O'Brien, Cleveland, Ohio, assignors to Harris-Intertype Corporation, Cleveland, Ohio, a corporation of Delaware Filed May 27, 1957, Ser. No. 661,633

21 Claims. (Cl. 95—4.5)

This invention relates to photographic type composition, and particularly to an improved system for spacing selected characters on a photographic record film as such characters are initially composed into record copy.

The primary object of this invention is to provide an improved system for controlling the spacing of characters as they are recorded in preselected arrangement upon a record strip of film or the like.

Another principal object of the invention is to provide phototypesetting apparatus including a device for projecting an image carrying light beam along a predetermined path in combination with apparatus for deflecting the image carrying beam through preselected small space units to afford a spacing control over the images projected onto a photosensitive strip of material independent of movement of the strip relative to the beam.

A further object of this invention is to provide in phototypesetting apparatus spacing mechanism for controlling the spacing of the successive characters projected along an image carrying light beam onto a photosensitive record strip, which spacing mechanism includes a device for deflecting the light beam relative to the film strip through small discrete space units and another device for advancing the film strip through a large space increment equal to a predetermined integral number of such space units whenever the total number of space units through which the deflecting device has moved is at least equal to a large space increment.

An additional object of the invention is to provide spacing mechanism as outlined above including apparatus which provides for adjustment of the deflecting device to a position corresponding to the excess of space units required in addition to spacing movement of the film strip by the film strip advancing device.

Another object of the invention is to provide spacing mechanism as above described including a word spacer which actuates the film strip advancing device a predetermined number of times to provide equal unexposed spacing portions between words on the film strip, and which word spacer actuates a suitable device, such as a word space punch, for marking the film strip in such unexposed word space portions.

An additional object of this invention is to provide in photographic typecomposing apparatus a computor which receives spacing information corresponding to the spacing requirements of the individual successively projected characters and actuates a transducer which mechanically shifts a deflecting means interposed between the character projecting means and the film record strip upon which the images are recorded to shift the axis of each image projected on the momentarily stationary record strip through a desired number of small discrete space units, and which computor totals the space unit information supplied to the transducer and actuates a suitable record strip advancing mechanism to advance the strip through a large space increment equal to an integral number of space units whenever the total number of space units is at least equal to a single large space increment.

Another object of this invention is to provide in photographic typecomposing apparatus as outlined above a

[Column 2]

reflecting means which is so arranged that shifting thereof does not affect the optical length between the character projecting means and the record strip and therefore does not affect the focus of the projecting means.

A further object of the invention is to provide in such photographic type composing apparatus a mounting for the reflecting means which substantially eliminates the resistance of starting friction to movement of the reflecting means.

Another object of this invention is to provide improved apparatus for positioning the photosensitive film strip accurately with respect to the exposure station where the image carrying light beam is projected onto the strip, including a dual purpose punch having mechanism for limiting the film strip engaging stroke thereof to provide for engagement of the film strip by the punch without perforating the film strip, and thus to hold the strip in properly indexed relation with respect to the exposure station, and wherein a further mechanism is provided for moving the punch through a longer strip perforating stroke to provide a register hole in the film strip when an acceptable line of words or the like has been recorded upon the film strip.

Another object of the invention is to provide, in conjunction with the computor and the transducer mechanism for actuating the film strip advancing apparatus, a delay circuit which retards the supply of spacing information to the film strip advancing mechanism and thereby prevents the supply of actuating pulses to such mechanism in succession faster than the ability of the mechanical parts of the film strip advancing mechanism to follow such actuating pulses.

Other objects and advantages of the invention will be apparent from the following description, the accompanying drawings and the appended claims.

In the drawings—

Fig. 1 is a somewhat diagrammatic top plan view of the mechanical parts of the improved character spacing apparatus provided by the invention, with certain parts removed for clarity of illustration;

Fig. 2 is a detail view of parts removed from Fig. 1;

Fig. 3 is a diagrammatic view of the character spacing apparatus provided by this invention, illustrating the connection of the mechanical and electronic parts thereof;

Fig. 4 is an enlarged detail view of the movable reflecting prisms and their mounting as seen in Figs. 1 and 2;

Fig. 5 is a detail view taken from the right hand side of the prism and mounting, as shown in Fig. 1, illustrating the relation between the movable reflecting prisms and the record strip;

Fig. 6 is a detail section taken along line 6—6 of Fig. 1;

Fig. 7 is an exploded perspective view of the escapement and Geneva drive mechanism utilized in the present invention;

Figs. 8 and 9 are, respectively, perspective and front plan views of the reflecting prism system utilized to displace the projected character images;

Fig. 10 is a detail view of the record strip brake seen in the upper left hand corner of Fig. 2;

Fig. 11 is a side elevation of the indexing punch and die mechanism which acts to fix the film strip during recording of images thereon;

Fig. 12 is a detail view taken on line 12—12 in Fig. 11;

Fig. 13 is an enlarged detail view, partly in section, of the punch and die shown in Fig. 11;

Fig. 14 is an enlarged detail taken on line 14—14 of Fig. 1, with certain parts broken away for clarity;

Fig. 15 is a view taken from the bottom of Fig. 11, showing the operating linkage of the punch in Fig. 11;

Fig. 16 is a detailed section on an enlarged scale taken on line 16—16 of Fig. 15;

Fig. 17 is a schematic diagram of a delay device utilized in the apparatus shown in Fig. 3;

Fig. 18 is a somewhat diagrammatic view of portions of a record strip which have been punched through and dimpled by the punch and die of Fig. 12;

Figure 19:
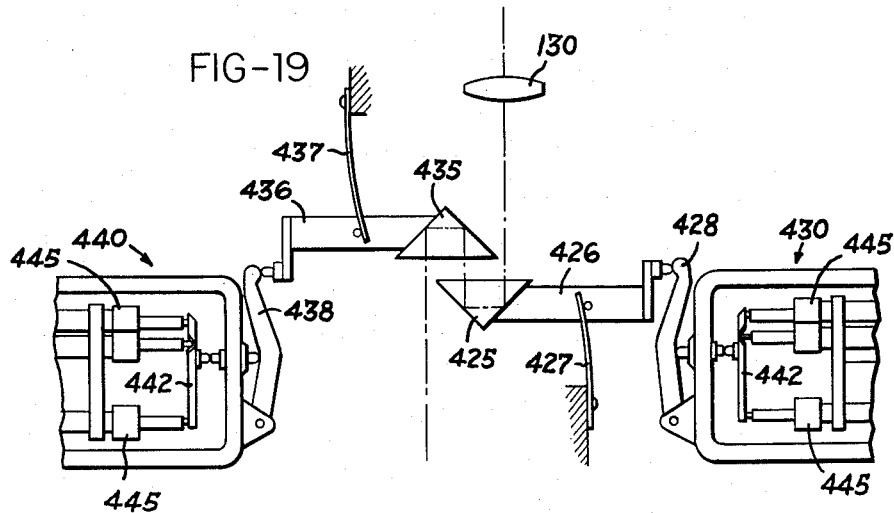
Fig. 19 shows a modified prism spacer arrangement.

Referring to the drawings, which illustrate preferred embodiments of the present invention, the overall arrangement of the photographic type compositing machine is in accordance with our copending application Serial No. 380,802, filed September 17, 1953, wherein a continuous rotating disk, a portion of which is shown at 10 in Fig. 3 herein, carries the characters as transparencies, and is arranged for continuous relative rotation with respect to a flashing light source 12 (Fig. 1) which is focused through a suitable lens 13 so as to illuminate an individual character on the periphery of the disk when the light source is flashed for a predetermined short duration. As described in said copending application the disk (Fig. 3) is divided into a number of zones each having a characteristic radial distance from the center of the disk. The first or outermost zone contains a plurality of uniformly spaced radial lines 15, one line for each character on the disk, and referred to as timing pulses. In the second zone there is a single transparent line (not illustrated here) which is referred to as a marker pulse. The third radially inward zone contains the characters 18 which in the preferred embodiments are 128 in number, equally spaced around the circumference of the zone. The next five zones contain a series of dot openings 20, each dot corresponding to one digit of a binary number which constitutes a measure of the width of the associated character, and thus for each character there will be a characteristic pattern of dots which expresses a particular binary number representing the width of the associated character. It will be understood that in the actual machine a particular character and its corresponding code dots are preferably not in radial alignment, for convenience in positioning the pick-up apparatus which cooperates with the disk.

A gas discharge tube 22 cooperates with a condensing lens 23 to illuminate an area covering a segment of the character disk, as defined by mask 24 having a radially extending slot therein which uncovers to the light from tube 22 an area of the disk corresponding to one set of dots 20. Aligned with these dots are five photocells 25a–25e, and the light striking these photocells will actuate one or more of them in accordance with the binary code number indicated by light passing through one or more dot openings 20. At the same time, and as more fully described in the above identified copending application, the light source 12 will be energized, and space code information supplied by actuation of one or more of photocells 25a–25e will correspond to the spacing requirements of the particular character passing in front of the light source.

A suitable pulse generator 30, arranged to generate electrical pulses at a rate of approximately 100,000 per second, for instance, is connected into the input circuit of a space computer 32 which consists of eleven binary stages included within the dotted lines, each stage being represented by one of the circles shown. The first six such stages comprise a point set counter 34, and the last five such stages comprise a space code counter 35. The photocells 25a–25e are connected to the individual stages of counter 35 through amplifiers 36a–36e, thereby feeding into computer 32 information corresponding to the spacing requirements of the successively projected characters. Such coded information preferably is in terms of one-sixteenth of an em space, which is the space having a set width in points equal to the point set.

Connected to the point set counter 34 is a point set control 37 which causes the counter to be preset by its own output pulse so as to emit a pulse each time it has counted a number of pulses equal to the point set as measured in quarter points. For example, if the operator desires to set type in eight and three-fourths point set, counter 34 will emit a pulse after having counted thirty-five pulses.

The space code counter 35 is set by energizing of the photocells 25a–25e, and therefore it will emit a pulse after it has counted a number of pulses equal to the set width of a character in sixteenths of an em space, and since a five digit code is used which can represent any number from 1 to 32, the space may be anywhere from one-sixteenth of an em space up to thirty-two sixteenths.

Counter 36 thus will emit a pulse after it has computed the product of the set width in quarter points and the space code in sixteenth em spaces, and this product will represent the actual width of the character in sixty-fourth points. The output circuit of counter 35 is connected to the stop circuit of pulse generator 30, and thus once the information corresponding to the actual width of a selected character is computed the generator will stop. The starting circuit of generator 30 is connected to a suitable selector counter, such as shown in the above identified copending application, which controls projections of the character through energization of light source 12, and supplying of the space code by energizing tube 22, both upon appearance of a character in photographing or projecting position opposite lens 13, following the actuation of a character key by the machine operator.

Therefore, every time a character is photographed the pulse generator 30 emits a number of pulses equal to the number of sixty-fourth points occupied by that character on the record strip, and since there are twelve points in a pica this number is also the width of the character in $\frac{1}{768}$ parts of a pica. These units are too small to be significant in spacing operations so this number is divided by six to give spacing units in terms of $\frac{1}{128}$ of a pica, which units are referred to as space units, and which are equal to approximately 0.0013 inch.

The output of generator 30 is thus connected to the input of a divider counter 40 which is arranged to emit a pulse after it has counted six pulses, and therefore emit a number of pulses equal to a set width of each character in space units. The remainder, after such number is counted, will remain in the divider counter 40 between successive operations so that the rounding-off error does not accumulate.

Obviously, the entire spacing arrangement here is flexible and the spacing information from the space code on disk 10 could be used to represent any suitable fractional part of an em space. For example, one fundamental unit of type dimensions is $\frac{1}{8}$ em and the information fed to space code counter 35 could represent set width of a character in $\frac{1}{8}$ of an em space. The code then would be capable of representing from $\frac{1}{8}$ to $1\frac{14}{8}$ of an em space, and if a character being photographed in 8¾ point set had a set width of $\frac{10}{8}$ of an em space computer 32 would emit a pulse after $10 \times 35 = 350$ pulses. The pulse generator 30 would then be emitting a number of pulses equal to the number of 72nd points occupied by the character on strip 135, and the output of the pulse generator would also represent the width of the character in $\frac{1}{864}$ parts of a pica. Divider counter 40 would then be set to divide by 6.75 in order to give an output representing space units in terms of $\frac{1}{128}$ part of a pica. Such a divider counter could be arranged by having it reset by its own output to divide three times in succession by seven and to be reset the fourth time to divide by six, thus giving four pulses at its output for every twenty-seven pulses supplied from pulse generator 30.

The space unit count from counter 40 is fed into a space memory counter 45, consisting of thirteen binary stages. Each of the first seven stages of counter 45 has its output fed through suitable amplifiers 47a–47g, and the outputs from such amplifiers are fed to the seven solenoids 50a–50g of a transducer 52 which is adapted to translate the information received from counter 45, in terms of signals, into mechanical movement of an output lever 55. Such translation is accomplished by having the solenoids 50a–50g actuate air valves 56a–56g which in turn control a supply of compressed air to pneumatic servomotors 57a–57g. The movement of the pistons of such servomotors is imparted to three triangular output members 58, 59 and 60, the last of which operates against an actuating pin 61 which operates lever 55. The details of such a transducer are more fully described in the copending application of Richard C. O'Brien, Serial No. 515,872, filed June 16, 1955, now Patent No. 2,889,109.

It will be appreciated that each stage of counter 45 includes a "flip-flop" circuit operating between two stable positions. A counter suitable for such purpose is shown in Patent No. 2,714,842, Fig. 11. Thus, each of the solenoids 50a–50g, and consequently the air valves 56a–56g, follows the state of the particular stage of the counter. In other words, in one stable position of the associated first counter stage solenoid 50a will be energized, and the next pulse fed to the first stage will cause the flip-flop in the first stage to change to its second stable position, thereby deenergizing solenoid 50a. It follows that each of the servomotor devices 57a–57g will occupy up or down positions corresponding to the two stable positions of an associated stage of counter 45. The largest output movement of the transducer output arm 55 will represent a spacing movement of just less than one pica, and thus in the example illustrated the output arm 55 can represent from $1/128$ to $127/128$ of a pica, or from 1 to 127 space units, since a pulse is fed into counter 45 for each spacing requirement of one space unit.

The output of the seventh stage of counter 45 is connected to a controlling flip-flop circuit 62 in addition to the eighth or successive stage of the counter. The flip-flop 62 follows in phase with the eighth stage of counter 45 with the result that whenever a pulse is fed into the eighth stage denoting a space requirement of a full pica, a pulse is also fed into flip-flop 62. The output of this flip-flop circuit 62 is connected to a "two-timer" delay circuit 65, and its output is in turn fed to a controlled flip-flop circuit 67 having its two outputs 68 and 69 fed to separate amplifiers 70 and 71, respectively. The output of amplifier 70 is fed to a solenoid 75 which controls the opening and closing of an air valve 76, and in like manner the output of amplifier 71 is fed to an amplifier 77 controlling an air valve 78. These air valves function as a second transducer and control, respectively, the supply of compressed air to a first air cylinder 80 having an output piston rod 81, and a second cylinder 82 having an output piston rod 83. These piston rods act on opposite sides of a pica spacing arm 85 which is pivotally mounted at 86 and carries a stop lug 88 at its other end for movement between two positions in accordance with the pivoting movement of arm 85, which movement is in turn due to shifting of the compressed air supply from cylinder 82 to cylinder 80 and back again. It will be appreciated that arm 85, therefore, is shifted every time a pulse is fed into the eighth stage of counter 45 denoting a spacing requirement of one pica.

Referring to Fig. 17, the details of a suitable "two-timer" delay circuit are shown in combination with certain details of the flip-flop circuits 62 and 67. The purpose of this circuit is to provide a delay in the supply of successive pulses to the mechanical element of the pica spacer arrangement described above, since in some instances it may be necessary for the pica spacer to make two space operations in the same cycle. For example, assuming that counter 45 has accepted a count of 120 pulses in the course of providing the spacing information from a previously recorded character image. Assuming also that the next character image to be recorded requires a spacing of 145 space units, then there will be two successive pulses supplied from the seventh stage of space computer 45 in less than 0.01 second. It is of course necessary to delay the supply of successive pulses to insure that the solenoids 75 and 77 do not receive pulses faster than they are able to operate.

The circuity involved in the "two-timer" delay arrangement includes the controlling flip-flop 62 including tube FF1 and the controlled flip-flop 67 including tube FF2. Only those portions of the circuits involving the tubes have been shown in Fig. 17, in the interests of clarity and since the balanced Eccles-Jordan type of circuit is well known. Two double grid tubes V1 and V2 have their plates connected to the plates of FF2, and their second grids G2 are connected to the grids of tube FF1. The first grids G1 of V1 and V2 are normally maintained in the conducting condition by the resistors R1 and R2, and therefore normally tubes V1 and V2 function as relay tubes whereby the position of FF1 is followed by FF2.

If the space counter 45 call for a step such as outlined above where two pulses are emitted from the seventh stage, FF1 will shift from one position to the other and back again (first one side and then the other conducting) in less time than the air valves and cylinder of the pica spacer can follow, so no movement at all will take place in the pica spacer.

For example, with tube V1 initially in the conducting state the plate of that tube is at low potential and the plate of V2 is at high potential. In the initial shift the potential of the plate of V2 drops from high to low, and the coupling capacitor C1, which is connected between the G1 grid of tube V1 and the plate of V2, impresses a similar negative voltage on G1 of tube V1. The potential of G1 in tube V1 gradually approaches the conducting value as the charge leaks off C1 through R1, but until this charge leaks off tube V1 will remain non-conductive regardless of the position of FF1 and regardless of the potentials on the grids G2. Thus, when FF1 makes two rapid shifts in succession, the second shift of FF2 is delayed until the potential of the appropriate G1 has recovered its normal conducting value, thereby allowing sufficient time for the mechanical movements of the pica spacer.

Since counter 45 (Fig. 3) is a thirteen stage counter, it will have a full count of $2^{13}$ or 8192 space units, corresponding to a space of 64 picas. At the beginning of operations the last six stages are preset by a line length control 90 to a number equal to the complement of the length of the line in picas. In other words, the desired line length in picas is subtracted from 64 and the result set into the line length control, and the first seven stages of the counter are preset to zero. Each of the thirteen stages of counter 45 is connected to a code lamp of a code bank illustrated schematically at 95. Some of these connections are indicated schematically in Fig. 3. These code lights, being energized for each zero count in their associated stage, will then read a total count corresponding to the desired line length, this being the complement in space units of the count preset into the counter, and as more fully described in the above identified application, Serial No. 380,802.

Provision is made for inserting a predetermined fixed amount of spacing between successive words in a line of composition without interfering with the operation counter 45. A switch 97, operated by the word space bar 98 is adapted to feed a single word space pulse from a suitable source such as a normally charged condenser 100 into a buffer 102, and at the same time into a delay circuit 103. The output of the delay circuit 103 is also fed into the buffer, so that the buffer receives first a pulse from source 100, upon closing of switch 97, and immediately following another pulse from the relay circuit 103. The buffer output 105 is connected to the controlling flip-flop circuit 62, so that for every word space pulse, as signaled by closing of switch 97, two pulses are fed into "two-timer" 65, with resultant successive actuation of the air valves 76 and 78 as described above, and double movement of pica spacer arm 85. In this manner a two pica word space is introduced between successive words in the line being composed.

The output of delay circuit 103 is also fed to a suitable amplifier 110 which has its output connected to a solenoid 112 controlling an air valve 113. This valve controls the operation of a pneumatic servomotor 115 operating to pivot a crank arm 117 about its pivot 118 and against the bias of spring 119 so as to actuate a word space punch 120. Thus each time a word space pulse is fed to buffer 102 and delay 103, the punch 120 is actuated, and this punch serves to perforate the film strip upon which the projected characters are recorded, as will presently be described. At the same time, each pulse formed by closing of switch 97 by the word space bar is fed through line 122 to a five stage word space memory counter 125, the respective stages of which are connected, as indicated diagrammatically, to five individual lights in the code bank 95, whereby the total number of word spaces is recorded for projection onto the film strip at the end of the composition of each line.

Referring to Figs. 1 and 2, the selected character images are projected along an image carrying light beam, due to energization of light source 12 behind the selected character on disk 10. This beam is directed along an optical axis defined by an optical lens system 130, for recording of the character images in sequence upon a record strip of film 135 which is fed past an exposure station indicated generally at 140. The film strip is supplied from a reel 142 carried within a light-tight casing 143 and unwound or fed by a drive motor indicated schematically at 144 and under control of a switch 145. The film passes around a guide roller 146 carried on the free swinging end of an arm 147 which is pivoted at 148 to the housing of the machine, and which is biased in a counterclockwise direction, as viewed in Fig. 1, by a spring 149. The film strip passes from roller 146 between the braking mechanism carried at the outer end of a pivoted brake arm 150 which is arranged to swing around a pivot pin 151 and is biased against a stop 152 by a spring 153.

Details of brake arm 150 are shown in Fig. 10, and include an upwardly extending bifurcated end 155 on the arm carrying a fixed brake shoe 158 and a movable brake shoe or clamp 160 carried on the end of an arm 162 which is pivotally mounted between the sides of bifurcated end 155, and which is connected through a pin 163 to a brake operating rod 165. This rod extends along brake arm 150 and through the upwardly projecting part of a supporting clamp 166 to a connection with a brake solenoid 170. A spring 172 acts between bracket 166 and a disk 173 fixed to rod 165 in a direction tending to thrust rod 165 to the left, thereby clamping the shoes 158 and 160 against the film strip 135. As the film is advanced during composing of a line solenoid 170 is energized to disengage the brake shoes, as shown in Fig. 10. When the solenoid 170 is deenergized, with arm 150 in the position shown in Fig. 1, the end of rod 165 moves forward to engage the roller 174 carried on the actuating arm of a normally closed switch 175. The resultant opening of switch 175 is momentary, as will be explained below in connection with the operation of the machine.

The film record strip 135 passes from brake arm 150 about a stationary guide roller 177, and from this roller across the recessed face of stationary backing plate 180 (Figs. 11–13) upon which there is supported a frame member 182 having an aperture 183 therein which defines the exposure station for the film strip. Plate 180 and frame member 182 are bolted to one face of a supporting block 185, and at the top of this block, extending over the upper edge of plate 180 and the upper edge of the film strip, is a relatively flexible guide plate 187 which holds the film in position vertically as it passes through the exposure station.

Referring to Fig. 12, it will be noted that in the upper right hand corner of frame member 182, above the upper edge of aperture 183, there is a small hole 190, and this hole is aligned with a die opening 192 (Fig. 13) in plate 180, and this die opening is in turn aligned with a small horizontal passage 193 in mounting block 185 which opens into a larger generally vertical passage 194. The word space punch 120 is adapted to pass through opening 190 and perforate film strip 135 upon actuation of the pneumatic servomotor 115, as described above. The pivot 118 about which punch 120 operates is shown as a cross rod (Figs. 2, 13 and 14) and the crank arm 117 is shown as including a vertical leg 117′ upon which punch 120 is carried, and a second horizontal arm 117″ (Fig. 14) secured to the pivot shaft 118 and engaged at its outer end by the bias spring 119 and the piston rod of the pneumatic servomotor. A pedestal 196 supports pivot shaft 118 in fixed vertical position.

Passing from plate 180 the film strip is threaded about a movable roller 200 mounted on a carriage 202 which is in turn supported for sliding movement along a guide block indicated generally at 205. Passing around roller 200, the film is threaded between a stripper block 208 and a punching die 210 having a central die aperture 212 which is aligned with a transverse passage 213 in the main supporting block 185, and which communicates with the vertical passage 194 therein. A dual purpose "hold" and "register" punch 215 is supported for sliding movement in stripper block 208 so as to act on the film strip 135 passing across die block 210 and perforate the film strip, with the removed material being carried away to passage 194 where it may drop to a suitable collection point. From the indexing punch the film strip is threaded about a further stationary roller 217 (Fig. 1) to a takeup reel 220 operating within a light-tight casing 222 and driven by a wind motor (shown diagramamtically at 224) which is periodically energized to reel in the exposed film after the composition of a line is completed, or for other reasons as will be outlined below.

Between the punch 215 and the movable roller 200 there is mounted suitable projecting apparatus 225 which is adapted to supply the space code information to the film strip 135 for use in subsequent justifying operations. This apparatus includes the code bank 95 and a suitable projecting lens. It will be noted that the location of this apparatus is between the punch 215 and that portion of the film strip upon which the characters to be recorded are projected, so that the space code information appears on the exposed film strip at the beginning of a line.

It is desirable to provide a means for differentiating between lines which are suitable for justifying and lines in which an error was made during composition, and which were composed over on the following portion of the film strip. For this purpose a driving arm 230 is mounted for pivotal movement about a supporting pin 232 (Figs. 11 and 13) and includes a head 235 adapted to engage the enlarged head 236 on punch 215 to drive the punch forwardly as arm 230 is rotated in a clockwise direction, as viewed in Fig. 11. A pin 237 extends from the forward portion of arm 230 to engage the punch head 236 on the return stroke of arm 230, for the purpose of disengaging the indexing punch from the film strip.

The lower end of arm 230 includes a bifurcated portion 238 (Fig. 15) within which one end of a drive rod 240 is secured, and the other end of the rod is fastened by a pin 241 to a cross arm 242 which is supported at its opposite ends in carrier blocks 245 and 246, being connected for pivotal movement to the former by a pin 247. Referring to Fig. 16, block 245 is carried on a hollow piston rod 250, abutting an annular shoulder 251, and the piston rod includes a piston head 252 operable in a cylinder 253 in response to pneumatic pressure applied through the hollow rod 250 from a supply tube 255. In the absence of pneumatic pressure in tube 255 the piston is urged into its forward or "bottomed" position shown in Fig. 16 by a suitable return spring 256 (Fig. 15). The other carrier block 246 is similarly supported on a hollow piston rod 258 supplied with air under pressure from a tube 260 to operate a piston 262 against the bias of a spring 263 which urges block 246 and the piston into its forward position. The end of arm 242 within block 246 is freely received within the block, so that the arm is moved thereby only when the abutment 264 engages the end of the cross arm, as the piston rod moves to the left in Fig. 15. A fulcrum pin 265 engages arm 242 and holds the end thereof away from abutment 264 except when piston 262 is actuated by supply of compressed air from tube 260.

In the operation of the punch actuating mechanism just described, when compressed air is supplied only to line 255 the cross arm 242 will pivot about pin 265, and punch 215 will be advanced only far enough to dimple film strip 135, leaving a slight indentation thereon as indicated at 270 in Fig. 18. This is sufficient to engage the dimpled surface of the film strip with die 210 and hold the strip in fixed relation thereto as the film strip is advanced during composition of the line by movement of roller 200, as will be described below. This arrangement constitutes the "hold" function of punch 215. If at any time the operator makes an error he may engage a suitable control (not shown) to withdraw the punch and have an unexposed portion of film moved into a position for recomposing of the line. When, on the other hand, the operator completes a line he may engage a suitable "end of line" control (not shown) which will cause compressed air to be supplied to line 260, and arm 242 will be pivoted in a clockwise direction, as viewed in Fig. 15, about pin 247, providing a further forward movement of the punch necessary to perforate the film strip. Thus, at the completion of an acceptable line the register hole 272 (Fig. 18) is punched into the film strip, for engagement with suitable pickup apparatus in a justifying machine. Such further movement of punch 215 constitutes its "register" function.

The controls for effecting sequential operation of various parts described above have not been illustrated herein since such controls are well known in the automatic machinery and similar arts, and are understood by those skilled in such arts. The overall scheduling of different components of the present apparatus will be described in a subsequent paragraph.

Referring to Figs. 1, 6 and 14, carriage 202 is shown to be generally T-shape in cross section, including a depending leg 275 extending through a vertical slot 276 in mounting block 205. At opposite ends of the carriage laterally extending feet 282 rest in sliding engagement upon the top of mounting block 280, and are in turn restrained against vertical movement by inwardly extending edges at the upper ends of plates 285 which are suitably secured to the sides of block 280, thereby defining the horizontal sliding path of the carriage. Rack teeth 287 are formed in the bottom edge of the vertical carriage portion 275, and mesh with a pinion 288 carried on the end of a stub shaft 290 which is suitably journaled in a supporting bracket 292. The pinion 288 and shaft 290 are received within a suitable bore 293 extending laterally into block 280, in alignment with the mounting bracket 292.

A drive gear 295 is secured to shaft 290, and is adapted to mesh with a main drive pinion 297 (Fig. 1), which pinion is in turn secured to one end of a main drive shaft 300. The main drive shaft is journaled in fore and rear support brackets 301 and 302, respectively, which are in turn secured to a T-shaped arm 305. The outermost end of this arm is pivoted at 307 and held on the pivot pin by a suitable bracket 308, while the forward outer ends of arm 305 are slidably received beneath guide brackets 309.

A drive control solenoid 310 is attached through arm 312 to the fore bracket 301, and adapted to move arm 305 from a position wherein pinion 297 meshes with drive gear 295, as defined by the adjustable stop pin 313, against the bias of a leaf spring 315 which normally holds pinion 297 and gear 295 in mesh. Energization of solenoid 310 will pivot the T-shaped arm 305 to the right, as viewed in Fig. 1, to disengage the driving gear and pinion.

A chain 317 is continuously driven from a suitable drive shaft or motor (not shown) and meshes with a sprocket 318 constituting part of a friction clutch 320 which provides a driving connection between the sprocket and a drive shaft 322 journaled in suitable support legs extending from the fixed mounting bracket 323 for the air cylinders 80 and 82.

The driving connection between shafts 300 and 322 consists of a combined four-position escapement and a Geneva drive mechanism, details of which are shown in Fig. 7. A collar 325 (Fig. 1) is fixed to the end of shaft 322 opposite friction clutch 320, and this collar carries a cross-shaped member 330 the cross members of which are provided with stops 331—334 at their outer ends. Stops 331 and 333 are spaced angularly from each other 180°, and stops 332 and 334 are also spaced angularly from each other 180° and axially from the stops 331 and 333. Stop 334 is not shown as a complete lug in Fig. 7, but it will be understood that the stop is at the end of the arm indicated by the arrow, and is in radial alignment with stop 332, being spaced axially from the other stops. These stops are adapted to be engaged, in succession, by the lug 88 on the pica space arm 85, as that arm is shifted between its two positions by the air cylinders 80 and 82.

With the pica space arm in one of its two positions, such as shown in Fig. 1 for example, lug 88 engages a stop (331 for example) and prevents rotation of shaft 322, causing friction clutch 320 to slip. When arm 85 is shifted to its other position member 330 will be free to rotate, and will do so through an angle of 90° until stop 332 strikes lug 88, whereupon member 330 will again be held stationary. In a similar manner the lug 88 engages successive stops 333 and 334, providing for rotation of member 330 through one fourth of a turn each time arm 85 is shifted.

Four pins 335, two of which are seen in Fig. 7, extend from the face of member 330 opposite from shaft 322, one pin adjacent each of the stop members. These pins are adapted to cooperate with the crossed slots 340 formed in the face of drive wheel 342 which is fixed to main drive shaft 300, and providing a Geneva drive. Thus, every time arm 85 is shifted shaft 300 and pinion 297 are rotated through 90°, and the gear reductions between pinion 297 and gear 295, and between pinion 288 and rack 287, are so arranged that each one quarter of a revolution of pinion 297 moves carriage 202 through a distance of one-half of a pica. It follows, therefore, that each time a pulse is fed to the eighth stage of counter 45, film strip 135 is advanced with respect to the exposure station through a distance of one pica, since the film strip passes around pulley 200, and since indexing punch 215 is engaging the film strip to hold it stationary forward of that pulley.

The character images projected along the axis of the optical lens system 130 are not projected directly to the exposure station, but rather the image carrying light beam is intercepted by a movable displacing means including a compound prism such as shown in Figs. 4, 8 and 9. This prism includes a first or receiving prism 350, the slanted surface of which reflects the image downwardly into a second or intermediate prism 352, and the image is then reflected from one inwardly slanted lower wall of that prism to the other slanted wall, whereupon it is reflected upwardly to the rearwardly slanted wall of a third or output prism 355, which is generally aligned with the exposure station as defined by the slot or aperture in frame member 182.

Since the optical axis through lens system 130 is stationary, movement of the entire prism system through a predetermined distance will result in movement of the image projected from output prism 355 through a distance twice that through which the prism system is moved. This relationship will be apparent from comparison of the full and dotted lines in Fig. 9, illustrating the center line of the reflected images before and after movement of the prism system. It will also be clear from this illustration that the length of the optical path through the prism system does not change when that system is moved, and therefore such movement does not affect the focus of the projected image.

Referring to Figs. 4 and 5, the reflecting prisms are supported in a generally V-shaped groove 357 formed in the upper surface of a carrying block 360, and the prisms are held in place by a cover plate 361. Block 360 has downwardly extending feet 362 at opposite ends, and inverted V-shaped grooves 363 are formed in these feet to rest upon a rod 365. An L-shaped mounting block 367 is supported to the rear and beneath rod 365, and carries a supporting bracket 368 having forwardly extending arms 370 with upright V-shaped grooves formed in the outer ends thereof to support rod 365 at opposite ends of block 360. A constantly rotating rod 372, driven by a motor 373 (Fig. 1) is connected to rotate rod 365 through a suitable coupling 374.

Block 360 is thus supported in sliding relation upon the rotating rod 365, and the block is held upon this rod by the biasing force of a pair of springs 375 pressing against the top of the block and positioned beneath the upper leg of Z-shaped brackets 377 which carry centering screws 378 extending coaxially within the springs, and terminating short of actual contact with the upper surface of block 360. To avoid pivoting of the block about rod 265 a spring 380 (Fig. 5), extends between a stud 381 at the top of block 360 and a pin 382 projecting from the upper surface of bracket 367, and holds the top of block 360 against a ball bearing roller 383 (Fig. 1).

Sliding movement of block 360 is produced by a push rod 385 (Fig. 1) fixed at one end to block 360 and engaged at its other end with the transducer output lever 55. Pivoting of lever 55 about pin 387 in response to movement of actuating pin 61 will thus shift block 360 to the left, as viewed in Fig. 1, and this shifting movement of the block is resisted by a leaf spring 388 engaging the opposite end of the block from rod 385. As previously explained, the transducer operates to translate pulses received from word space memory counter 45 into mechanical movement of lever 55. It will be apparent that the movement of the output lever can be determined by properly selecting the lengths of the various lever arms in the output members 58, 59 and 60 (Fig. 3) of the transducer and the effective distances between pivot pin 387, actuating pin 61, and the point of engagement between push rod 385 and arm 55 (Fig. 1). These various distances are so selected that movement of block 360 will occur in small discrete distances ranging from one-half of a space unit up to $63 \cdot 5/128$ or one-half space unit less than one-half a pica.

The movement of block 360 will cause the image projected at the exposure station to be displaced in a direction away from that in which film strip 135 is advanced, or to the left as viewed in Fig. 1, and since each discrete movement of the prism system results in a displacement of the projected image through a distance twice that of the prism movement the spacing of the projected images with respect to the film strip, resulting from movement of the reflecting means, will be twice that of the movement of block 360. In other words, every time block 360 is moved through one space unit the image at the exposure station is shifted through two space units.

It follows from the above that the spacing information supplied from counter 45 in accordance with the spacing requirements of each projected character image will result in spacing of successively projected characters on film strip 135 by shifting of the reflecting means until the total spacing information supplied by counter 45 equals one space unit less than a full pica. When the spacing totals equal or exceed a full pica or pulse will be fed to the eighth stage of counter 45, causing shifting of the pica spacing lever 85 as described above, and carriage 202 will advance the film strip 135 through a full pica with respect to the exposure station. At the same time, the transducer output arm 55 will return to a position corresponding to the number of space units counted in excess of a full pica and the reflecting means will be returned toward its base or zero position accordingly. A suitable set screw 389 may be provided to define such base position.

Fig. 19 is a somewhat schematic illustration of a modified arrangement of reflecting prisms and transducers which may be used in place of the compound prism system shown in Figs. 8 and 9 and the transducer 52. In this arrangement the image carrying light beam passing through the projecting lens system 130 is received in a first prism 425 mounted on a movable arm 426 which is biased in one direction by a spring 427 and urged against the spring bias by the output arm 428 of a first transducer 430. The light beam passing from prism 425 is received by a second spacing prism 435 carried on a movable arm 436 which is also biased in one direction by a spring 437 and urged against such bias by an output arm 438 of a second transducer 440. Each of the transducers 430 and 440 is equivalent in basic construction to the transducer 52, but is of only one-third the size and therefore includes only one triangular output arm 442 and three solenoid controlled pneumatic motor device 445.

The six solenoids are connected to the second through the seventh stages of the word space memory counter 45, in exactly the same manner as the solenoids 50b—50g in Fig. 3, and the leverage ratios of the output arms 428 and 438 are such that the output movement of the one connected to the second, third and fourth stages of counter 45 is one-eighth the movement of the other arm. This arrangement results in a total range of displacement of the finally projected light beam, from the prism 435, which is equivalent to the range of movement provided by the apparatus shown in Fig. 3, with the exception that the smallest increment of movement, or space unit, is $1/64$ of a pica rather than $1/128$. It has been found that in some cases deflection of the image carrying light beam through such a small increment as $1/128$ of a pica is of no practical advantage since such slight movement can barely be detected. The arrangement shown in Fig. 19 provides a total range of output movements from $1/64$ to $63/64$ of a pica, and this has been found satisfactory for most purposes. It is understood of course, that suitable anti-friction mountings are provided to define the path of movement of arms 426 and 436, for instance of a type shown in connection with the compound prism and its mounting in Fig. 1.

Figure 20:
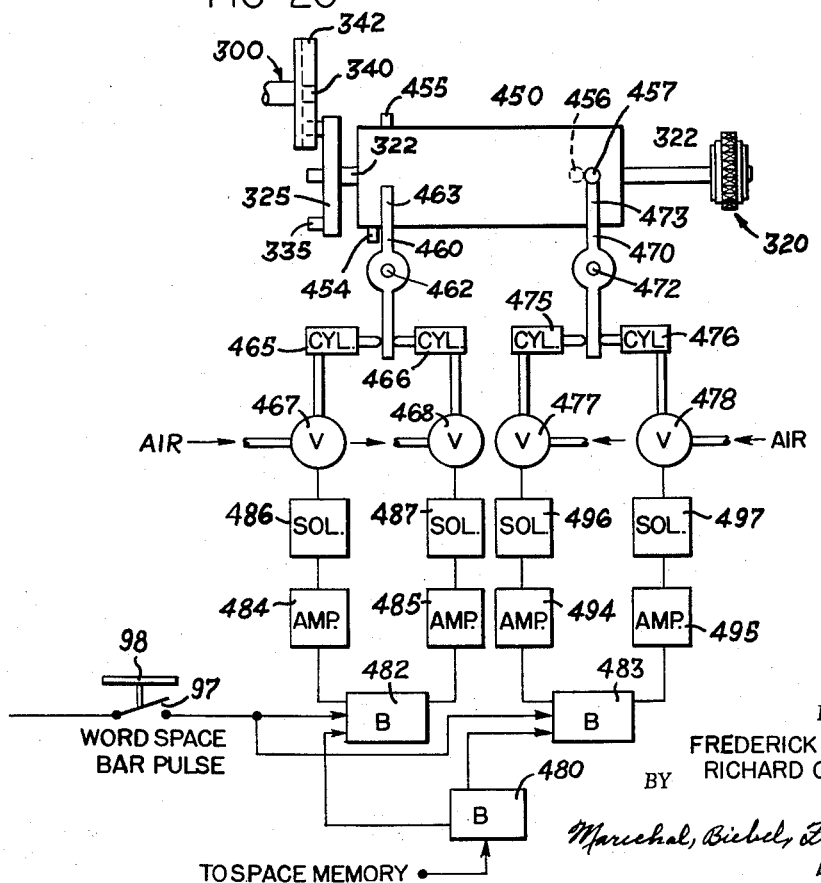
Fig. 20 is a diagrammatic view of a modified word spacer mechanism.

A modified type of transducer arrangement for advancing the film strip through large space increments is shown in Fig. 20. Here, the power input through clutch 320 and shaft 322 is the same as shown in Fig. 1, and shaft 322 again rotates the driving member 325 of the Geneva mechanism having pins 335 receivable in the closed slots 340 of the output member 342 which in turn drives the output shaft 300. An escapement drum 450 is fixed on shaft 322, and has a first pair of axially spaced pins 454 and 455 extending from its outer surface, spaced apart 180° around the periphery of drum 450. Further down the drum a pair of pins 456 and 457 project from the surface of the drum, spaced axially from each other and spaced apart 180° about the drum periphery. Pins 456 and 457 are also spaced angularly 90° from the pins 454 and 455, respectively.

A first stop arm 460 is pivoted at 462 for movement of the extending end 463 thereof between positions where it will engage either pin 454 or 455 as the drum rotates, and movement of arm 460 between these two positions is controlled by a pair of pneumatic motors 465 and 466, controlled respectively by valves 467 and 468. A second arm 470 is pivoted at 472 for movement between positions where its outer end 473 engages one or the other of stops 456 and 457, and movement of arm 470 is controlled by pneumatic motors 475 and 476 operated respectively by valves 477 and 478. With this arrangement shifting of that arm which is engaging a stop pin on the drum will permit rotation of drum 450 through 90°, until the other arm engages the pin in its path. For example, in the drawing arm 470 engages pin 457, and shifting of the end 473 of this arm to the left will permit the drum to revolve until pin 455 strikes the end 463 of arm 460. However, if both arms 460 and 470 are shifted substantially simultaneously, the drum will rotate 180°, or until pin 456 strikes the end of arm 470.

The output movement of this mechanism is transmitted through shaft 300 to the pinion 297 of the carriage drive shown in Fig. 1. The result, then, is a quarter turn of shaft 300, one movement of the Geneva mechanism, for each single movement of a control arm 460 and 470, and a half turn for concurrent movement of both arms.

The above described modified escapement apparatus is connected in such a way that it replaces the two-timer mechanism shown in Fig. 17, along with the buffer 102 and delay 103 shown in Fig. 3. Pulses from the output of the seventh stage of counter 45 are fed to a bistable or binary circuit 480 which shifts between its two stable positions in the usual manner for each successive pulse fed thereto. The opposite sides of binary circuit 480 are connected to further similar binary circuits 482 and 483, so that successive pulses fed to circuit 480 cause further pulses to be fed alternately to circuits 482 and 483. The opposite sides of circuits 482 are connected through amplifiers 484 and 485 to solenoids 486 and 487 which are connected to operate, respectively, the valves 467 and 468 controlling arm 460. Similarly, opposite sides of circuit 483 are connected to amplifiers 494 and 495 and these amplifiers feed solenoids 496 and 497 which control, respectively, the valves 477 and 478 governing movement of control arm 470.

Briefly, the operation of this device is as follows. Assuming that the mechanism is stopped as shown in the drawing, and that the first pulse fed to bistable circuit 480 will be passed on to bistable circuit 483, from there a signal is sent through amplifier 494 to solenoid 496, opening air valve 477 and admitting pressure air to motor 475 which causes arm 470 to shift to its other position. This moves the end 473 of the arm out of engagement with pin 457 and drum 450 rotates until pin 455 strikes the end 463 of arm 460. Shaft 300 is thus rotated one-quarter turn, or as previously explained, the film strip is advanced one pica.

The next pulse is bistable circuit 480 is passed on to circuit 482, and from there a signal passes through amplifier 484 to solenoid 486, causing valve 467 to open and shifting arm 460 so that pin 455 is freed, and drum 450 revolves one-quarter turn until pin 456 strikes the end 473 of arm 470, which is in its shifted position as described above. The next pulse to circuit 480 passes again to circuit 483, and this time a signal is fed to amplifier 495 and solenoid 497 is energized to open valve 478, admitting pressure air to motor 476 and shifting arm 470 back to the position shown in Fig. 20. This frees pin 456 and the drum rotates another quarter turn until pin 454 strikes arm 460, which in turn is in its shifted position as described above. In a similar manner the fourth input pulse to circuit 480 serves to energize solenoid 487 and shift arm 460 back to the illustrated position. From this it follows that for each output pulse of the seventh stage of counter 45 there is a quarter turn of shaft 300, moving the film strip forward through a distance of one pica.

In order to insert a two pica word space the word space bar 98 and its associated switch 97 are connected to feed negative pulses into both the binary circuits 482 and 483, causing a shift of both arms 460 and 470. Assuming that the arms are in the illustrated positions, such a double shift will free pin 457 and pin 455 will pass the shifted arm 460, with the drum 450 rotating a complete half-turn until pin 456 strikes the end 473 of the shifted arm 470. The resultant half-turn of output shaft 300 will advance the film strip a distance of two picas.

*Sequence of operation*

As mentioned previously, the automatic controls for scheduling or programming the operation of the various components of the present apparatus have not been disclosed in detail, since such controls are well known and understood by those skilled in the art. However, the sequence which such control follows will be briefly described, beginning with the assumption that the film strip is threaded in place as shown in Fig. 1, and that the operator is prepared to compose a line.

The electrical supply to the unwind motor 144 is under the control of a switch 145 the operating button of which is supported in the path of movement of film tensioning arm 147. This switch is normally open, but will close to operate motor 144 whenever arm 147 is swung through an arc against the bias of spring 149, indicating that a further supply of film is needed. Film will then be payed out from reel 142 until spring 149 in applying tension to the film strip draws arm 147 away from the switch, causing it to open.

With the operator commencing to compose a line by operating the keyboard (such as shown in Patent No. 2,714,842), a solenoid 397 (Fig. 1) will be energized to open an air valve 398 and supply air under pressure through line 255 to the piston 252, causing indexing punch 215 to dimple, but not perforate, the surface of the film strip and fix the position of the forward portion of a strip of film upon which a line is to be composed. At the same time, solenoid 310 will be deenergized, permitting pinion 297 to mesh with gear 295 and completing the drive of the pica spacing mechanism, and a switch in the circuit to wind motor 225 is opened to deenergize that motor.

Composition of the line continues as the operator manipulates the keyboard, and the film strip 135 is advanced with respect to the exposure station through increments of one pica, as explained above, until a line is completed, assuming that no errors are made during such composition. The operator then actuates an "end of line" switch by pressing a button on the keyboard, and this momentarily energizes a solenoid 400 to open an air valve 401 and supply air through line 260 to the piston 262, whereby the indexing punch is made to perforate a film strip and provide an indexing hold at the beginning of the line. Also at the end of the line the solenoid 310 is energized to withdraw pinion 297 from mesh with gear 295, and solenoid 170 is deenergized to clamp the brake arms 158 and 160 to the film, and the resultant movement of rod 165 momentarily opens switch 175.

At this point the solenoids 397 and 400 are deenergized causing withdrawal of the indexing punch, and the wind motor 224 is energized. Since carriage 202 is free to move, as the film strip is wound on reel 220 the carriage and pulley 200 are pulled to the left (as viewed in Fig. 1) until the carriage reaches its base or starting position. This position is defined by a stud or stop 405 which is adapted to be engaged by an abutment arm 406 depending from carriage 202. The arrangement is such that these members abut only at the base position of the carriage, and during operation of the machine by the time the stud 405 makes a complete revolution the arm 406 has moved beyond gear 295. With the carriage in its base position and reel 220 continuing to take up the film, the brake arm 150 is carried by the moving film strip against the bias of spring 153, this movement paying out an additional length of strip as necessary to leave sufficient space between lines for recording of the space code information. When the arm 150 strikes the operating button of a switch 408 the brake arms are released, the wind motor is stopped, solenoid 310 is deenergized, and solenoid 397 is energized to move the indexing punch to its dimpling position, ready to record another line.

If, during the course of composing a line, the operator discovers that he has made an error he may reject the unacceptable line or portion of a line by operating a button which closes a reject switch (not shown). This will cause the solenoid 397 to be deenergized and withdraw the indexing punch 215 without perforating the film strip, and will also cause the apparatus to go through its "end of the line" sequence just described so as to feed a fresh strip of film into position for recomposing of the rejected line.

The phototypesetting apparatus provided by this invention is therefore capable of rapid and accurate spacing of the successively projected character images, and it is necessary to advance the record strip 135 only through large space increments, with spacings of less than a full large space increment, such as fractions of a pica, accomplished by deflection of the image carrying light beam without altering the length of the optical path and the focus of the projected image. This arrangement greatly reduces the effects of inertia in the film strip advancing mechanism upon the spacing mechanism, since it is unnecessary to disturb the strip advancing mechanism for every slight spacing movement.

Another important advantage of the present apparatus resides in the provision of mechanism responsive to actuation of the word space bar on the typewriter, effective to advance the record strip through a predetermined number of large space increments, and thus to provide exactly equal word spaces of predetermined length between the words recorded on the record strip. The provision of such equal word spaces is significant in the operation of a justifying apparatus which operates from the film strip prepared in the device disclosed herein.

In addition, the present apparatus provides a means for distinguishing between acceptable lines recorded on the record strip and lines in which an error was made, and which therefore are unsuitable for justification. The "hold" and "register" punch mechanism disclosed herein provides for differentiation between acceptable and unacceptable lines, since a suitable pickup mechanism may be provided in the justifying machine for sensing the presence of a "beginning of line" perforation in the film, and if no such perforation is present, as in the case where the punch 215 is withdrawn leaving only a dimple in the surface of the record strip, the record strip in the justifying machine would be advanced over the places on which an unacceptable line had been recorded.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A device for recording a succession of character images upon a record strip, comprising means for selectively projecting an image carrying light beam along a predetermined path, movable means intercepting said beam for displacing said beam from the original said path, means for supporting a photosensitive strip of material in position to record in succession the images carried along the displaced path, shifting means for said movable displacing means adapted to move through discrete small space units for displacing the successively projected character images relative to the record strip, movable carriage means for advancing the strip relative to said image carrying light beam through large space increments equal to an integral number of said space units, and means for correlating the operation of said carriage means and said shifting means to provide for advancing said carriage means whenever the required spacing movement totals at least one full space increment.

2. A device for recording a succession of character images upon a record strip, comprising means for selectively projecting an image carrying light beam along a predetermined path, movable means intercepting said beam for displacing said beam from the original said path, means for supporting a photosensitive strip of material in position to record in succession the images carried along the displaced path, shifting means for said movable displacing means adapted to move through discrete small space units for displacing the successively projected character images relative to the record strip, movable carriage means for advancing the strip relative to said image carrying light beam through large space increments equal to an integral number of space units, computing means for calculating the spacing requirements of each individual projected image, and means connecting said computing means to said shifting means and to said carriage means for moving said shifting means through said small discrete space units and for advancing said carriage means whenever the total required spacing movement totals at least one said large space increment to displace successively projected images on the record strip in accordance with the spacing requirements of the individual images.

3. In apparatus of the character described the combination of means for projecting an image carrying light beam from a fixed station, means for supporting a record strip of film, means for advancing said record strip through relatively large space increments for recording in succession thereon the projected character images, means for optically transmitting the projected character images from said projecting means onto the record strip, means for shifting said optical transmitting means with respect to said projecting means through discrete small space units equal to integral parts of a space increment to displace successively projected images in relation to each other on the record strip, computing means for totaling the spacing requirements of successively projected character images, and means operatively connecting said shifting means and said advancing means to said computing means for advancing the record strip through a large space increment when the total spacing requirements of successively projected images is at least equal to a full space increment and for adjusting the position of said shifting means to correspond to the total small space units remaining in excess of a full space increment after advancing of said record strip.

4. A device for recording a succession of character images upon a record strip of photosensitive material or the like in spaced relation according to the spacing occupied by the individual character images, comprising means for projecting character images in preselected succession at a fixed station, means for supporting the record strip for recording the projected images in succession thereon, means for optically transmitting the projected images from said projecting means onto the record strip, means defining a base position for said optical transmitting means with respect to said projecting means, means for shifting said optical transmitting means from said base position through small discrete space units in accordance with the spacing requirements of a projected image to position a projected image on the record strip in properly spaced relation to a previously recorded image, computing means cooperating with said projecting means for totaling the spacing movements of said shifting means, and means operatively connecting said computing means and said record strip supporting means for advancing the record strip through a large space increment equal to an integral number of space units with respect to the base position of said optical transmitting means when the total of the spacing movements required is at least equal to a full space increment.

5. A device for recording a succession of character images upon a record strip of photosensitive material or the like in spaced relation according to the spacing occupied by the individual character images, comprising means for projecting character images in preselected succession at a fixed station, means for supporting the record strip for recording the projected images in succession thereon, means for optically transmitting the projected images from said projecting means onto the record strip, means defining a base position for said optical transmitting means with respect to said projecting means, means for shifting said optical transmitting means from said base position through small discrete space units in accordance with the spacing requirements of a projected image to position a projected image on the record strip in properly spaced relation to a previously recorded image, computing means cooperating with said projecting means for totaling the spacing movements of said shifting means, means operatively connecting said computing means and said record strip supporting means for advancing the record strip through a large space increment equal to an integral number of space units with respect to the base position of said optical transmitting means when the total of the spacing movements required is at least equal to a full space increment, and means for adjusting the position of said shifting means with respect to its base position after advancing the record strip to correspond to the remaining space units counted by said computing means in excess of a full space increment.

6. Apparatus of the character described comprising means for projecting character images including a fixed lens, means for supporting a record strip of film for recording said character images in succession thereon, means for optically transmitting the character images from said lens onto the record strip, means for shifting said optical transmitting means with respect to said lens through discrete integral parts of a typographical spacing measurement in accordance with the spacing requirements of a projected character image, computing means for totaling the spacing requirements of successively projected character images, and means including an operative connection between said record strip supporting means and said computing means for advancing the record strip through a full spacing measurement when the total spacing requirements of successively projected images is at least equal to a full such spacing measurement.

7. A device for recording a succession of character images upon a record strip of photosensitive material or the like comprising means defining an optical axis along which character images may be projected in succession, movable reflecting means for reflecting images projected along said axis onto a record strip, a movable carriage for supporting a record strip in operative relation to said reflecting means, shifting means for moving said reflecting means relative to said carriage, spacing means connected to said carriage for advancing the record strip through large spacing increments, a computer for computing and totaling the spacing requirements of the successively projected character images, means connecting said computer to said shifting means and said spacing means for moving said shifting means through small discrete space units equal to integral parts of a space increment and for advancing said spacing means whenever the total of space units is at least equal to a large space increment.

8. A device for recording a succession of character images upon a record strip of photosensitive material or the like comprising means defining an optical axis along which character images may be projected in succession, movable reflecting means for reflecting images projected along said axis onto a record strip, a movable carriage for supporting a record strip in operative relation to said reflecting means, shifting means for moving said reflecting means relative to said carriage, spacing means connected to said carriage for advancing the record strip through large spacing increments, a computer for computing and totaling the spacing requirements of the successively projected character images, means connecting said computer to said shifting means and said spacing means for moving said shifting means through small discrete space units equal to integral parts of a space increment and for advancing said spacing means whenever the total space units is at least equal to a space increment, and means for adjusting the position of said shifting means to correspond to the remainder of total space units after advancement of said spacing means.

9. In a device for recording a succession of character images upon a photosensitive record strip in spaced relation with respect to each other in accordance with the individual spacing requirements of the images, the combination of means for projecting an image carrying light beam along a predetermined path, means defining an exposure station at which said light beam is directed, movable means intercepting said beam for displacing said beam from the original said path while maintaining the length of said path unchanged to alter the position of the projected images at the exposure station and to maintain proper focus thereof, means for supporting photosensitive record material at said exposure station for recording in succession thereon the projected character images, means operative on said supporting means to advance the photosensitive material relative to said beam along the same path as the relative movement therebetween caused by said beam displacing means, and means responsive to the sequence of character images projected for coordination of said beam displacing means and said advancing means to produce total relative movement between said beam and said supporting means along said same path as required for the spacing of each projected character image.

10. Phototypesetting apparatus of the character described including the combination of means for selectively projecting an image carrying light beam along a predetermined path, movable means intercepting said beam for displacing said beam from the original said path, means for supporting a photosensitive strip of material in position to record in succession the images carried along the displaced beam, shifting means for said displacing means adapted to move through discrete small space units for displacing the successively projected character images relative to the record strip, movable carriage means for advancing the strip relative to said image carrying light beam through large discrete space increments, a multistage binary computer for calculating the spacing requirements of each individual projected image, means for supplying spacing information to said computer corresponding to the individual projected images, primary transducer means connecting lower stages of said computer to said shifting means for moving said shifting means through small discrete space units, and secondary transducer means connecting at least one higher stage of said computer to said movable carriage means for advancing the strip through large discrete space increments.

11. In phototypesetting apparatus of the character described the combination of means for projecting an image carrying light beam along a predetermined path, means defining an exposure station at which the light beam is directed, movable means intercepting said beam for displacing said beam from the original said path to alter the position of the projected images at said exposure station, means for supporting a photosensitive record strip at said exposure station, shifting means for said movable displacing means adapted to move through discrete small space units for displacing the successively projected character images relative to the record strip, movable carriage means arranged to advance the strip relative to said exposure station through large discrete space increments, word space indicating means adjacent said exposure station and arranged for selectively marking the record strip, computing means for calculating the spacing requirements of each individual projected image, means for supplying to said computing means spacing information corresponding to each individual projected character image, transducer means connecting said computing means to said shifting means and to said carriage means for moving said shifting means through small discrete space units and for advancing said carriage means when the total required spacing is at least equal to one large space increment to displace successively projected images on the record strip in accordance with their individual spacing requirements, means for causing said transducer means to advance said carriage means independently of said computing means to advance unexposed portions of the record strip beyond said exposure station and provide word spaces thereon, and means for actuating said word space indicating means to mark the record strip in the unexposed word space portions thereof.

12. A device of the character described comprising the combination of a matrix having a plurality of character images thereon and also having data thereon corresponding to the spacing requirements of the individual character images, means for selecting desired images in sequence, means defining an optical axis, a computer, means for projecting the character images in sequence along said optical axis, means for supplying spacing data to said computer in the same sequence, movable reflecting means for reflecting images projected along said axis onto a record strip, shifting means for moving said reflecting means to displace successively projected images relative to the record strip, means connecting said computer to said shifting means for effecting movement thereof through small discrete space units corresponding to the spacing requirements of the individual character images, a movable carriage for supporting a record strip in operative relation to said reflecting means, spacing means connected to said carriage for advancing the record strip with respect to said reflecting means, and means connecting said computer to said spacing means for effecting movement of said spacing means through large discrete spacing increments whenever the total of small space units is at least equal to a large spacing increment.

13. A device for recording a succession of character images upon a record strip of photosensitive material or the like comprising means for selectively projecting character images along an optical axis, a computer, means for supplying to said computer coded data corresponding to the spacing requirements of individual projected images, movable reflecting means for displacing the projected images with respect to said optical axis, means for supporting a record strip in position to record in succession the images reflected by said reflecting means, shifting means including a movable support for said reflecting means for displacing successively projected images relative to the record strip through small discrete space units, a carriage cooperating with said strip supporting means for advancing the record strip through large discrete space increments, a transducer having an output arm operatively connected to said shifting means, means including an escapement for advancing said carriage through a single large space increment for each actuation of said escapement, means connecting said computer to said transducer for moving said output arm in accordance with individual totals of small space units, and means connecting said computer to said escapement for actuation thereof when the total number of small space units is at least equal to a single large space increment.

14. In phototypesetting apparatus of the character described the combination of means for projecting character images in preselected succession upon a strip of photosensitive material, means for supporting a record strip in position for recording the projecting images, means for advancing said strip with respect to said projecting means in accordance with the spacing requirements of successively projected images, punch means adapted to engage said strip beyond said advancing means providing a reference therefor, means limiting the initial engaging stroke of said punch means providing for a non-perforating engagement of said punch means with said strip at the commencement of composing a line, means for completing the stroke of said punch means at the completion of an acceptable line, and means for withdrawing said punch means from non-perforating engagement with said strip without completing the stroke of said punch means.

15. A device for recording a succession of character images upon a record strip, comprising means for selectively projecting character images along an optical axis, means for supporting a photosensitive strip of material in position to record the images thereon, means for moving said strip past said optical axis providing for recording of the projected images in succession thereon, punch means for engaging said strip beyond said supporting means in the direction of motion of said strip to hold a portion of said strip stationary providing a reference for said strip moving means, means for limiting the forward stroke of said punch means providing for a non-perforating engagement of said punch means with said strip at the commencement of a recording operation, means for completing the stroke of said punch means at the completion of an acceptable recording operation to perforate said strip providing an index for locating a given succession of recorded images on said strip, and means for withdrawing said punch means from non-perforating engagement with said strip to provide for advancing said strip past said punch means without forming an index perforation therein.

16. In phototypesetting apparatus of the character described the combination of a means for projecting character images in preselected succession along an optical axis, movable reflecting means arranged to intercept said character images and displace said images with respect to said projecting means, means supporting a photosensitive strip of material to record in succession the images reflected by said reflecting means, shifting means for said reflecting means adapted to displace the images relative to said record strip, means for advancing said strip relative to said reflecting means, means for correlating the operation of said shifting means and said strip advancing means to space successively projected characters recorded on said strip in accordance with their individual space requirements, punch means adapted to engage said strip beyond said advancing means providing a reference therefor, means limiting the initial engaging stroke of said punch means providing for a non-perforating engagement of said punch means with said strip at the commencement of composing a line, means for completing the stroke of said punch means at the completion of an acceptable line to perforate the strip providing an index for locating the beginning of the acceptable line, and means for withdrawing said punch means from non-perforating engagement with said strip without completion of the stroke of said punch means to avoid perforating the strip at the beginning of an unacceptable line.

17. A device for recording a succession of character images upon a photosensitive record material or the like, comprising character object means for forming a light beam into a desired character defining shape, light means supported to illuminate said object means for forming an image carrying light beam projected along a predetermined path, means for mounting photosensitive record material in predetermined position with respect to said object means for focusing the image carrying beam thereon, movable means intercepting said image carrying light beam for displacing the path of said beam, shifting means for said displacing means adapted to move through discrete small space units for displacing the projected light beam with respect to the record material, movable carriage means arranged to produce relative movement through large space increments equal to an integral number of said space units between said object means and said mounting means, said relative movement being additive to the spacing movement provided by said displacing means, and means correlating the operation of said carriage means and said shifting means for moving said carriage means whenever the required spacing movement totals a number of space units equal to at least one full space increment.

18. A device for recording a succession of character images upon a photosensitive record material or the like, comprising character object means for forming a light beam into a desired character defining shape, light means supported to illuminate said object means for forming an image carrying light beam projected along a predetermined path, means for mounting photosensitive record material in predetermined position with respect to said object means for focusing the image carrying beam thereon, movable means intercepting said image carrying light beam for displacing the path of said beam, shifting means for said displacing means adapted to move through discrete small space units for displacing the projected light beam with respect to the record material, movable carriage means arranged to produce relative movement through large space increments equal to an integral number of said space units between said object means and said mounting means, said relative movement being additive to the spacing movement provided by said displacing means, means correlating the operation of said carriage means and said shifting means for moving said carriage means whenever the required spacing movement totals a number of space units equal to at least one full space increment, and means for adjusting the position of said shifting means to correspond to the remainder of space units after movement of said carriage means.

19. Phototypesetting apparatus of the character described including the combination of means for selectively projecting an image carrying light beam along a predetermined path, movable means intercepting said beam for displacing said beam from the original said path, means for supporting photosensitive material in position to record in succession the images carried along the displaced beam, shifting means for said displacing means adapted to move through discrete small space units for displacing the successively projected character images relative to the photosensitive material, movable carriage means arranged to produce relative movement between said projecting means and the photosensitive material through large space increments equal to an integral number of space units, a multi-stage binary computer for calculating spacing requirements, means for supplying spacing information to said computer, primary transducer means connecting lower stages of said computer to said shifting means for moving said shifting means through small discrete space units, and secondary transducer means connecting at least one higher stage of said computer to said movable carriage means for causing relative movement through large space increments between said projecting means and the photosensitive material.

20. A device for recording a succession of character images upon a record strip, comprising means for selectively projecting an image carrying light beam along a predetermined path, movable means intercepting said beam for displacing said beam from the original said path, means for supporting photosensitive record material in position to record the images carried along the displaced path, shifting means for said movable displacing means adapted to move through discrete small space units for displacing the successively projected images relative to the photosensitive material, movable carriage means arranged to produce relative movement through large space increments equal to an integral number of said space units between said projecting means and said record material supporting means, computing means for calculating the spacing requirements between projected images, and means connecting said computing means to said shifting means and to said carriage means for moving said shifting means through small discrete space units and for moving said carriage means whenever the total required spacing movement totals at least one said large space increment.

21. In phototypesetting apparatus of the character described the combination of a means for projecting character images in preselected succession along a common optical path, means for selecting the succession of characters to be projected, means defining the common path along which successive character image bearing light beams are projected, means for mounting photosensitive record material in predetermined position for focusing the image bearing beams thereon, movable means mounted to intercept said image bearing light beams for displacing the paths of said beams to produce relative spacing movement of said beam with respect to the photosensitive record material in the direction of a line of composition, shifting means for said displacing means adapted to move through discrete small space units for displacing the projected light beams with respect to the record material, movable carriage means arranged to produce relative movement through large space increments equal to an integral number of said space units in the same direction as the line of composition to be prepared, the relative movement between said beams and said photosensitive record material being supplementary to the spacing movement provided by said displacing means, a multi-stage binary computer for calculating space requirements, primary transducer means connecting lower stages of said computer to said displacing means for producing an analogue spacing output of said displacing means related to digital information in said lower stages, secondary transducer means connecting at least one higher stage of said computer to said movable carriage means for causing movement of said carriage through large space increments related to digital information in said higher stage, means for supplying relative width information related to each character projected, point set control means connected to said space information means to multiply the relative spacing information in accordance with point set information, and an input to said computer for supplying digital space information for each character in the form of a burst of pulses, the number of pulses in each burst being related to the actual space to be allotted to a corresponding character.

References Cited in the file of this patent

UNITED STATES PATENTS

| | | |
|---|---|---|
| 1,904,301 | Delafon | Apr. 18, 1933 |
| 1,975,439 | Uher | Oct. 2, 1934 |
| 2,207,266 | Ogden | July 9, 1940 |
| 2,229,689 | Westover | Jan. 28, 1941 |
| 2,388,961 | Elliott | Nov. 13, 1945 |
| 2,670,665 | Caldwell | Mar. 2, 1954 |
| 2,787,654 | Peery | Apr. 2, 1957 |
| 2,791,162 | Snyder | May 7, 1957 |